Jan. 14, 1947.        O. TALLAKSEN        2,414,425
FISHING LURE
Filed March 17, 1945
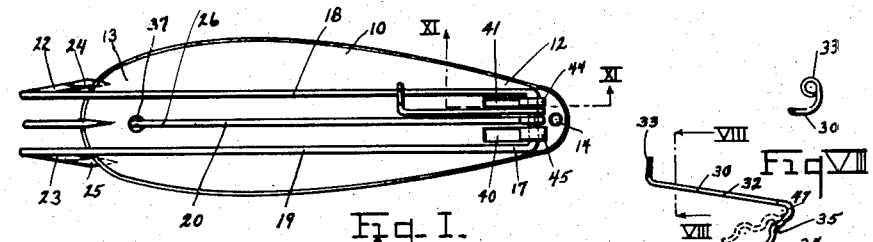
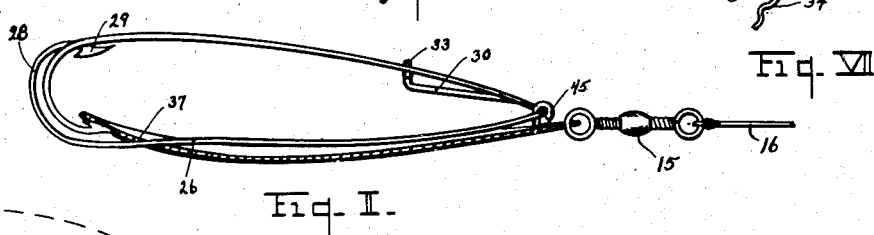
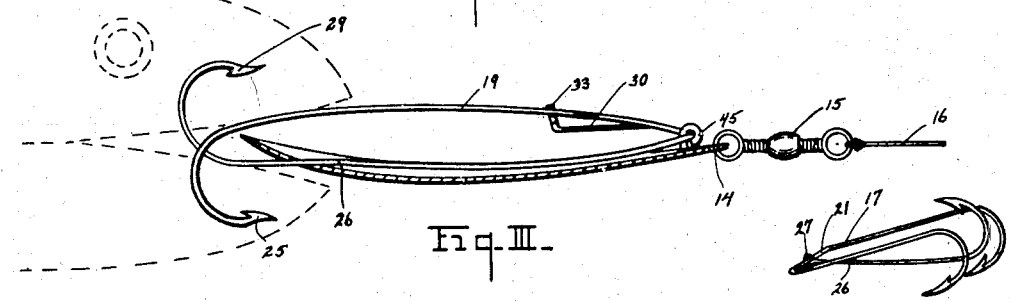
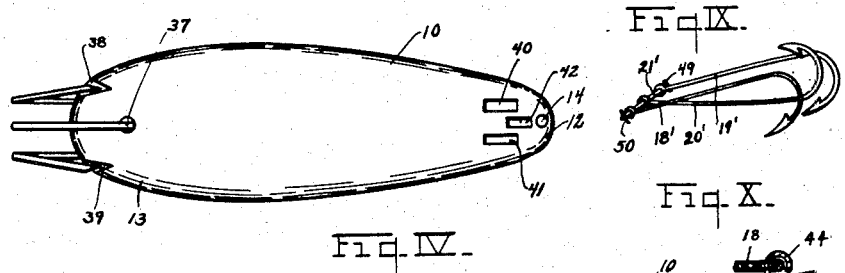
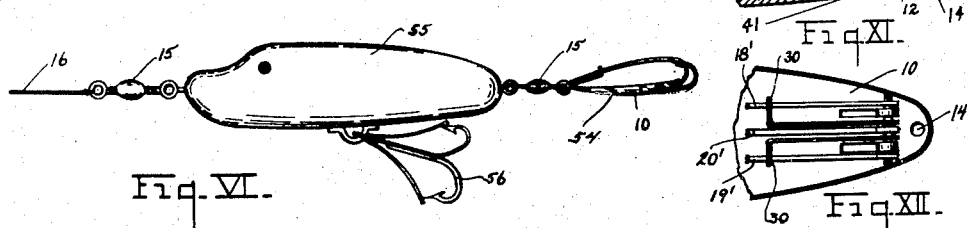
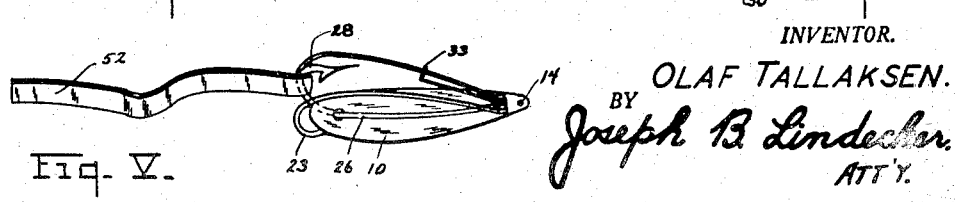
INVENTOR.
OLAF TALLAKSEN.
BY Joseph B. Lindecker.
ATT'Y.

Patented Jan. 14, 1947

2,414,425

UNITED STATES PATENT OFFICE 2,414,425

FISHING LURE

Olaf Tallaksen, Chicago, Ill., assignor of one-half to Joseph B. Lindecker, Skokie, Ill.

Application March 17, 1945, Serial No. 583,245

11 Claims. (Cl. 43—46)

This invention relates to artificial baits and the primary object is to provide an improved fish bait which is particularly adapted to casting and trolling.

A feature of the invention resides in a novel device or spoon with the arrangement of a plurality of fish hooks and their supporting member whereby, when said hooks are in their normal position, the device may be used in grass or seaweed and the danger of said grass or seaweed catching onto the hooks carried thereby is greatly lessened.

Another feature of the invention is to provide a rigid hook or means for attaching a pork rind, or any other type of lure, in combination with, and positioned between a pair of downwardly positioned spring actuated hook-like members, the barb on each of the latter hook-like members being positioned or arranged to rest against or in furrows made in the body of the spoon so that the device may be used as a weedless spoon.

Another feature of the present invention is to provide a new and improved casting and trolling spoon of a character such that the fish will be less likely to get off the hooks.

A still further feature is to produce a device of this character which is economical to manufacture, and simple to employ.

Other features, objects and advantages will be apparent during the course of the following description.

In the accompanying drawing forming a part of this specification and in which like numerals are employed to designate like parts throughout the same:

Figure I is a top plan view of my improved casting and trolling spoon.

Figure II is a side elevation of the same, with the bowl in section and the hooks in a closed and weedless position.

Figure III is a view similar to Figure II showing the hooks in open position, or the relative positions which they occupy after they have been taken by the mouth of a fish.

Figure IV is a bottom plan view of the same device.

Figure V is a perspective view of said spoon with a pork rind attached thereto.

Figure VI is a side elevation of a fish lure with my improved and novel spoon attached at the rear thereof.

Figure VII is a side view of the spring shown in views I, II, III, V and VI.

Figure VIII is a fragmentary view taken on line VIII—VIII of Figure VII.

Figure IX is a perspective view showing how the hooks may be assembled prior to attachment to the bowl of the spoon.

Figure X is a perspective view showing how three separate individual hooks may be assembled together prior to attachment to the bowl of the spoon.

Figure XI is a fragmentary sectional view taken substantially on line XI—XI of Figure I.

Figure XII is a fragmentary view showing a modified form of this invention.

Referring to the drawing by character of reference the numeral 10 designates in general an elongated bowl of the spoon having an upper concave surface and a lower convex surface. The bowl 10 is provided with a tapering body converging to a front rounded end 12, with the rear end 13 thereof being rounded and larger than the front end of said bowl. In the front end 12, an aperture 14, or any suitable means, is provided for loosely receiving the swivel 15 having a line 16 attached thereto as shown in Figures II and III. In practice the concavo-convex bowl 10 of the spoon is heavy enough to aid in insuring the travel of the spoon hooks through the water with the hooks in uppermost position, hereinafter described, and as shown in Figure II While the bowl is preferably made of light weight metal, I do not limit myself to the use of metal.

Two hook-like members are usually employed to produce this device which is economical to manufacture. A dual or double ended hook-like member 17, with shanks 18 and 19, or two separate hooks secured together to act as a dual hook, is movable as hereinafter described. Another hook like member 20 may be referred to as the stationary member in that it is fixed relative to the bowl 10, said member 20 being loosely and suitably secured by eye 27 to cross member 21 of said hook-like member 17. Since said member 20 is stationary it may be soldered, welded, or otherwise secured to said bowl 10 if desired. Said member 17, has two shanks or arms 18 and 19 formed from a single piece of wire, said arms extending parallel to each other, or substantially so, the greater part of their distance. The hooks 22 and 23 thereof being curved downwardly and backwardly, and formed at the end portion thereof with barbs 24 and 25 at the extremities thereof. The stationary member 20 is provided with a shank 26, eye 27, and upwardly and backwardly curved hook 28, with a barb 29 at the extremity of this backwardly turned portion. The points or barbs of the hooks being turned inwardly are normally held yieldingly in position, by one or more springs 30 whereby the points are protected against snagging, the arrangement of these hooks being such that the point 29 of the center hook 28 will project beyond the body of the movable hooks 22 and 23 when the shanks 18, 19 and 26 are pressed together or towards each other in any manner; thus causing said points 24 and 25 also to be exposed. The spring 30 has a shank portion 32, eye 33, and free end 34, said end portion 34 being formed with several curved portions 35 to assist in securing said spring in place beneath cross member 21 of said dual hook-like member 17. Said spring serves to hold the points or barbs 24 and 25 on hooks 22 and 23 against the rear end of the bowl 10, or in the furrows 38 and 39 formed in the body of said bowl 10, as shown in Figures I, II, IV, V and VI. Said spring is shown in detail by Figure VII, the eye 33 being large enough to fit over a barb 24 and shank 18, or the like. When said spring is assembled as shown in Figures I, II and III, the lower internal section of the eye pushing outwardly against the shank 18 keeping the barbs 24 and 25 against the bowl 10, since the free end 34 is forced between cross member 21 and the concave section of the bowl 10 causing compression or yielding action in the curved portion of the spring.

The bowl 10 is stamped or formed with an upper concave surface and a lower convex surface, with aperture 14, in the forward end 12, and aperture 37 in rear portion 13 and openings 40, 41 and 42 in the central or forward portion of the bowl. The material forced from the opening 40 and 41, is caused to curl upwardly, forwardly and then downwardly to form two permanent bearings 44 and 45 to hold member 21 in the desired position. The opening 42 is positioned so as to receive the edge portion of eye 27 on shank 26 which is positioned on member 21 substantially midway between shanks 18 and 19. The curved portion 47 of spring 30 is shown positioned between bearing 44 and eye 27, the arrangement of said bearings, eye 27 and spring portion 47 being such that suitable movement of the arms and hooks will be attained.

The hook-like members may be assembled as shown in Figure IX, by sliding the eye 27 of shank 26 over one of the pointed ends of the hook of the dual member. After said members are assembled they can be placed upon the concave surface of the bowl, with shank 26 extending through opening 37; the bearing members closed over member 21 and soldered or otherwise secured in place. Figure X shows a modified form of the invention where three hook-like members 18', 19' and 20' are assembled upon a cross pin 21' with suitable end members 49 and 50 thereon. The three hooks function exactly the same as was described above, however two spring members 30 will be required, said members being formed as right and left hand types as shown in Figure XII.

This novel bait is shown in Figure V with a pork rind 52 attached to the hook 28, said hook always being rigid and centrally arranged between hooks 22 and 23.

The novel fish bait described above as a casting and trolling spoon may also be used as a weedless lure 54 attached at the rear end of any other suitable lure as for example the lure 55 shown in Figure VI with weedless hook 56 extending downwardly therefrom; the lure 54 being substantially as shown in Figures I, II, III, IV and V.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, what I claim as new and desire to protect by Letters Patent is:

1. In fish lures, a non-buoyant body, a line attached at one end of the body, a plurality of movable hooks, a mounting for said hooks secured to said body, said hooks being pivoted to said mounting and their pivoted ends being positioned at the same end of the body as the line attachment, a rigid hook adjacent said hooks and secured to said mounting, and spring actuating means to permit movement of said pivoted hooks from one position and return same to that position if moved.

2. In fish lures, a non-buoyant concavo-convex body, means for attaching a line at one end of the body, a dual type fish hook with two parallel shanks and a common supporting member between said shanks, said shanks being pivotally secured to the supporting member on the concave side of said body, the free extremities of said dual hook forming downwardly directed hooks positioned adjacent to the rear end of said body, a rigid hook having an eye portion with the eye assembled upon the common member between said shanks of the pivoted hook, said rigid hook having its shank extending to the rear of said body with its curved hook portion directed upwardly and positioned between said downwardly directed hooks, furrows located on said concavo-convex body adapted to receive the pointed ends of said downwardly directed hooks, and spring actuating means to permit movement of said dual type pivoted hook from one position and return same to that position if moved.

3. A fish bait of the class described comprising a body, a dual hook with a cross member, and a single hook assembled thereon and positioned between the shanks and hooks of said dual hook, said hooks being assembled on said body, furrows located on said body adapted to receive the pointed ends of said dual hook, and a spring means having an eye portion at one end thereof and assembled upon the shank portion of said dual hook and the opposite end portion of said spring being positioned between the cross member of said dual hook and said body, said spring comprising means to permit movement of said dual hook from one position and return it to that same position if moved.

4. In a fish lure, a concavo-convex body, means for attaching a line at one end of the body, a mounting for receiving hooks secured to the same end of the body, a plurality of hooks pivoted to said mounting, a rigid hook positioned at the same end and adjacent said hooks and secured to said mounting, and spring actuating means associated with said mounting for permitting movement of said pivoted hooks and for returning the pivoted hooks to their normal position, said hooks serving to protect each other and lessen the danger of entanglement with weeds when used in water where weeds prevail, and said body having means to limit movement of the movable hooks.

5. A fish lure comprising a non-buoyant body having line attaching means at one end thereof, a plurality of movable hooks having spaced shanks and a common connecting part, said part being pivoted to the body at the end adjacent the attaching means, a rigid hook mounted on the common part and substantially rigidly positioned in the space between said shanks, and spring actuated means to permit the shanks to simultaneously move relative to the body and return the same to normal position, said spring actuated means being mounted on the common part, and said body having means to limit movement of the movable hooks.

6. In a fish lure, a non-buoyant body having a means for attaching a line at one end thereof, a mounting on the body, two downwardly directed hooks pivoted to the mounting at the end adjacent the attaching means and having their pointed ends positioned at the other end thereof, a rigid upwardly directed hook positioned and secured between said pivoted hooks, and spring actuating means associated with said mounting for returning the pivoted hooks to their normal position, the bight portions of the pivoted hooks serving to substantially protect the barbed end of said rigid hook from entanglment with weeds, and said body having means to limit movement of the pivoted hooks.

7. In a fish lure, a body having means for attaching a line at one end thereof, two downwardly directed hooks pivoted to a mounting secured to the body and having their pointed ends positioned at the other end thereof, a rigid upwardly directed hook positioned between said pivoted hooks, and spring actuating means to permit movement of said pivoted hooks from one position and return same to that position, the shank and bight portions of the two pivoted hooks substantially serving to protect the barbed end of the rigid hook from entanglement with weeds, and said body having means to limit movement of the pivoted hooks.

8. A fish lure comprising a non-buoyant body, two substantially similar shaped hooks mounted on the body, a mounting for said hooks, said hooks being positioned in spaced relation and having means at one end thereof secured to said mounting, a third hook secured to the mounting in the space between the first named hooks, and spring means secured to the mounting in the space between the first named hooks and adapted to permit movement of the first named hooks from one position relative to said body and positively return them to that position, said third hook always being substantially in the same relation laterally with respect to the first named hooks and being substantially stationary with respect to said body, said body having means to limit movement of the movable hooks.

9. In fish lures comprising a non-buoyant concavo-convex body having line attaching means at one end of said body and recesses at the opposite end thereof, two downwardly directed and substantially similar shaped pivoted hooks mounted on the body, a mounting for said hooks near the same end of said body, a rigid upwardly directed hook positioned between said pivoted hooks, and spring actuating means to permit the shank portions of said pivoted hooks to simultaneously move to one position relative to the body and return the same to that position, the recesses adapted to receive the pointed ends of said pivoted hooks.

10. A fish lure comprising a metal concavo-convex body having secured thereto a dual hook provided with a common cross member and a single hook mounted on the cross member, said body having extending therefrom and constituting an integral part thereof projections provided with eye formations at the free end thereof constituting bearing members for the common cross member, said bearing members being spaced from each other, said single hook having a shank positioned in the space between the bearings, the dual hook having its shanks on opposite sides of the single hook, and means to limit movement of the dual hook.

11. A weedless fish bait of the class described having a body and secured thereto a dual hook provided with a common cross member and a single hook assembled on said cross member, said cross member being pivoted to said body, and spring means assembled upon the body and adapted to permit movement of the dual hook to one position relative to said body and positively return it to that position, said single hook always being substantially in the same relation laterally with respect to said dual hook and substantially stationary with respect to said body.

OLAF TALLAKSEN.